United States Patent
Zhao et al.

(10) Patent No.: US 11,335,181 B2
(45) Date of Patent: May 17, 2022

(54) SYSTEMS AND METHODS FOR SECURITY SENSOR CONFIGURATION

(71) Applicant: ADEMCO INC., Golden Valley, MN (US)

(72) Inventors: Min Chao Zhao, Shanghai (CN); Yu Lin Li, Shanghai (CN); Ting Li, Shanghai (CN)

(73) Assignee: Ademco Inc., Golden Valley, MN (US)

( * ) Notice: Subject to any disclaimer, the term of this patent is extended or adjusted under 35 U.S.C. 154(b) by 23 days.

(21) Appl. No.: 16/923,263

(22) Filed: Jul. 8, 2020

(65) Prior Publication Data
US 2020/0342743 A1    Oct. 29, 2020

Related U.S. Application Data

(63) Continuation of application No. 16/791,637, filed on Feb. 14, 2020, now Pat. No. 10,748,412, which is a continuation of application No. 15/851,170, filed on Dec. 21, 2017, now Pat. No. 10,600,312.

(51) Int. Cl.
| | |
|---|---|
| *G08B 25/00* | (2006.01) |
| *G08B 25/10* | (2006.01) |
| *H04L 29/08* | (2006.01) |
| *H04L 67/12* | (2022.01) |
| *G08B 25/14* | (2006.01) |

(52) U.S. Cl.
CPC ........... *G08B 25/008* (2013.01); *G08B 25/10* (2013.01); *H04L 67/12* (2013.01); *G08B 25/14* (2013.01)

(58) Field of Classification Search
CPC ...... G08B 25/008; G08B 25/10; G08B 25/14; H04L 67/12
See application file for complete search history.

(56) References Cited

U.S. PATENT DOCUMENTS

| | | | |
|---|---|---|---|
| 6,198,389 B1 | 3/2001 | Buccola | |
| 6,288,639 B1 * | 9/2001 | Addy | G08B 25/10 340/3.1 |
| 7,528,711 B2 | 5/2009 | Kates | |
| 8,136,738 B1 * | 3/2012 | Kopp | F24F 11/30 236/51 |

(Continued)

FOREIGN PATENT DOCUMENTS

| | | |
|---|---|---|
| AU | 615798 B2 | 10/1991 |
| EP | 3 136 353 A1 | 3/2017 |

(Continued)

OTHER PUBLICATIONS

English language translation of bibliographic data and abstract for KR100848929 (B1).

(Continued)

*Primary Examiner* — Chico A Foxx
(74) *Attorney, Agent, or Firm* — Fredrikson & Byron, P.A.

(57) ABSTRACT

Systems and methods for configuring a security sensor are provided. Some methods can include receiving user input identifying a configuration setting of the security sensor through a user input device located on the security sensor, identifying the configuration setting based on the user input, transmitting a registration message to a security system control panel identifying the configuration setting, and operating in accordance with the configuration setting.

20 Claims, 3 Drawing Sheets

(56) References Cited

U.S. PATENT DOCUMENTS

| | | |
|---|---|---|
| 8,185,049 B2 | 5/2012 | Zhang |
| 10,169,983 B2 | 1/2019 | H. M. |
| 10,252,037 B2 | 4/2019 | Degen et al. |
| 11,100,786 B2 * | 8/2021 | Dey ................. G08B 13/08 |
| 2002/0077077 A1 | 6/2002 | Rezvani |
| 2002/0126137 A1 | 9/2002 | Kaestner |
| 2004/0090327 A1 | 5/2004 | Soloway |
| 2006/0209176 A1 | 9/2006 | Nakamura |
| 2008/0252598 A1 | 10/2008 | Fan |
| 2010/0145479 A1 | 6/2010 | Griffiths |
| 2010/0219948 A1 | 9/2010 | Eaawa |
| 2012/0203841 A1 | 8/2012 | Cavalcanti |
| 2012/0286951 A1 | 11/2012 | Hess |
| 2013/0067544 A1 | 3/2013 | Kwark et al. |
| 2014/0036728 A1 | 2/2014 | An |
| 2014/0258727 A1 | 9/2014 | Schmit |
| 2014/0266687 A1 * | 9/2014 | Britton ................ H04Q 9/00 340/539.1 |
| 2014/0288912 A1 | 9/2014 | Inoue |
| 2014/0375436 A1 | 12/2014 | Rezvani |
| 2015/0221209 A1 | 8/2015 | Janardhanan |
| 2015/0281872 A1 | 10/2015 | Pierrel |
| 2015/0332585 A1 | 11/2015 | H.M. |
| 2016/0183037 A1 | 6/2016 | Grohman |
| 2016/0189528 A1 | 6/2016 | Lee |
| 2016/0267774 A1 * | 9/2016 | Janardhanan ........ G08B 25/008 |
| 2016/0326765 A1 | 11/2016 | Barbret |
| 2016/0341437 A1 * | 11/2016 | Matsuoka ............. G05B 15/02 |
| 2017/0013069 A1 | 1/2017 | Grohman |
| 2017/0032658 A1 * | 2/2017 | Magyar ................ H04W 76/10 |
| 2017/0078018 A1 | 3/2017 | Walma, Jr. |
| 2017/0082997 A1 | 3/2017 | Lu et al. |
| 2017/0119207 A1 | 5/2017 | Kim |
| 2017/0159268 A1 * | 6/2017 | Chevalier ............... E03B 7/071 |
| 2017/0201583 A1 * | 7/2017 | Leyman .......... G06K 19/06028 |
| 2017/0238192 A1 * | 8/2017 | Lee ........................ H04L 67/12 455/500 |
| 2017/0240079 A1 | 8/2017 | Petrovski |
| 2018/0227171 A1 | 8/2018 | Yoshida et al. |

FOREIGN PATENT DOCUMENTS

| | | |
|---|---|---|
| KR | 10-0848929 B1 | 8/2008 |
| WO | WO 00/49589 A1 | 8/2000 |

OTHER PUBLICATIONS

English language translation of Patent Record Full View of KR848929B1.

Alarm Systems—Custom Security Systems, accessed electronically on Oct. 27, 2017, http://customsecuritysystems.com/home-security/alarm-systems/.

Extended European search report for corresponding EP patent application 18192491.1, dated Mar. 20, 2019.

* cited by examiner

SYSTEMS AND METHODS FOR SECURITY SENSOR CONFIGURATION

CROSS-REFERENCE TO RELATED APPLICATIONS

This application is a continuation of and claims the benefit of the filing date of U.S. application Ser. No. 16/791,637 filed Feb. 14, 2020, which is a continuation of and claims the benefit of the filing date of U.S. application Ser. No. 15/851,170 filed Dec. 21, 2017, which issued as U.S. Pat. No. 10,600,312 on Mar. 24, 2020.

FIELD

The present invention relates generally to security systems. More particularly, the present invention relates to systems and methods for configuring a security sensor within a security system.

BACKGROUND

Security systems are known to detect threats within a secured area, and such threats include events that represent a risk to human safety or a risk to assets.

Security systems typically include one or more security sensors that detect the threats within the secured area. For example, smoke, motion, and/or intrusion sensors are distributed throughout the secured area in order to detect the threats.

For less sophisticated users, configuring the security sensors of a security system can be quite difficult. For example, known security sensors are configured within the security system using a web-based interface or a mobile application. While these configuration methods successfully configure the security sensors, many users, especially residential customers, find such a configuration process daunting or difficult. As such, there is a need for a simpler and more efficient system and method for configuring the security sensors within the security system.

DETAILED DESCRIPTION

Figure 1:
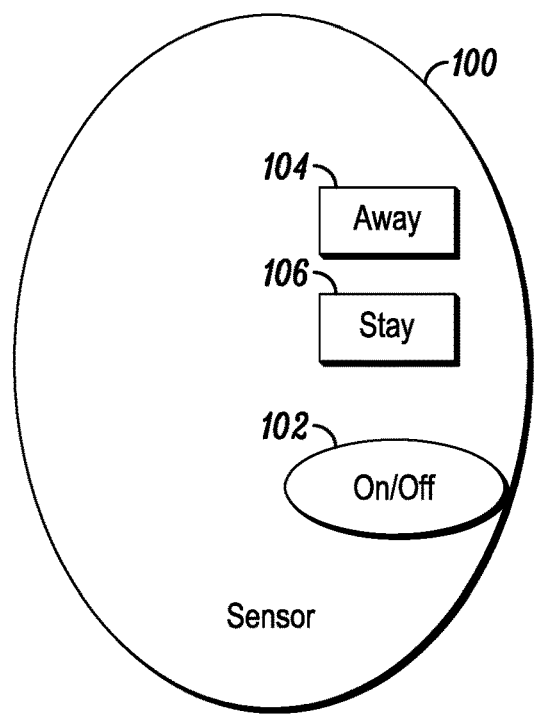
FIG. 1 is a block diagram of a security sensor with configuration buttons in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for configuring a security sensor within a security system. In some embodiments, the security sensor can include one or more buttons or one or more toggles that can automatically set a working mode for the security sensor, such as a total alarm mode or a partial alarm mode. For example, the total alarm mode can configure the security sensor to be active when the security system is operating with either an arm-away status or an arm-stay status, and the partial alarm mode can configure the security sensor to be active only when the security system is operating with the arm-away status. In some embodiments, the security system operating with the arm-away status can include activating all of the security sensors in a secured area, and in some embodiments, the security system operating with the arm-stay status, such as when a homeowner or other authorized person is present within the secured area, can include deactivating the security sensors located in an internal portion of the secured area (e.g. motion sensors, internal security cameras) and activating the security sensors along a periphery of the secured area or at potential avenues of ingress into the secured area (e.g. windows, doors, etc.).

In some embodiments, a user can place the security sensor at a desired location, press a single first button of the one or more buttons on the security sensor to set the security sensor to a first working mode, and turn on the security sensor. Furthermore, in some embodiments, the security sensor can identify the first working mode for the security sensor based on the first button that was pressed by the user and can automatically register with a control panel of the security system in accordance with the first working mode.

In some embodiments, the user may reallocate or reconfigure the security sensor by pressing a second button of the one or more buttons on the security sensor that is different than the first button and resetting the security sensor. For example, resetting the security sensor can cause the security sensor to re-register with the control panel in accordance with a second working mode that corresponds to the second button (e.g. the security sensor can change from the total alarm mode to the partial alarm mode). Additionally or alternatively, the user can add a new security sensor to the security system by purchasing the new security sensor and configuring the new security sensor using the one or more buttons. Additionally or alternatively, the user can remove the security sensor or the new security sensor from the security system by pressing an on/off button on the security sensor or the new security system.

In some embodiments, the security sensor may include at least an on/off button and a working mode selection input on an exterior of a housing of the security sensor. For example, the working mode selection input may include a plurality of buttons, wherein each of the plurality of buttons corresponds to a respective working mode for the security sensor, or a toggle switch, wherein each of a plurality of positions of the toggle switch corresponds to the respective working mode for the security sensor. The user may activate or deactivate the security sensor by pressing the on/off button and may configure the security sensor by pressing or toggling the working mode selection input. In some embodiments, the security sensor may also include an LED indicator or a display that can shine a light or display text indicative of the working mode for the security sensor selected by the user.

FIG. 1 is a block diagram of a security sensor 100 in accordance with disclosed embodiments. As shown in FIG. 1, the security sensor 100 can include an on/off button 102, an away button 104, and a stay button 106. User input selecting the on/off button 102 can activate or deactivate the security sensor 100, user input selecting the away button 104 can cause the security sensor 100 to register with a control panel of a security sensor in accordance with a total alarm mode, and user input selecting the stay button 104 can cause the security sensor 100 to register with the control panel of the security system in accordance with a partial alarm mode. For example, the total alarm mode can cause the security sensor 100 to be active and detect threats when the control panel of the security system is operating either with an alarm-away status or an alarm-stay status, and the partial alarm mode can cause the security sensor 100 to be active and detect threats only when the control panel of the security system is operating with the alarm-away status.

Although not illustrated, in some embodiments, the security sensor 100 can additionally or alternatively include a display, and in some embodiments the security sensor 100 can additionally or alternatively include a single working mode selection button. For example, user input selecting the single working mode selection button can cause the security sensor 100 to shuffle through a plurality of working modes available to the security sensor 100, each of which can be displayed on the display for selection by a user. In some embodiments, the display may include one or more LEDs, an LCD screen, or the like, and in some embodiments, the single working mode selection button may also be displayed on a touch screen of the display.

Figure 2:
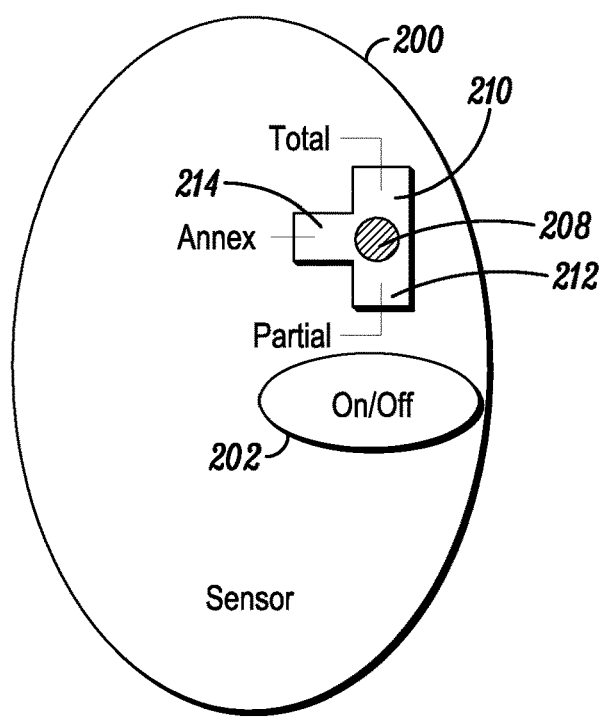
FIG. 2 is a block diagram a security sensor with a configuration toggle in accordance with disclosed embodiments.

FIG. 2 is a block diagram of a security sensor 200 in accordance with disclosed embodiments. As shown in FIG. 2, the security sensor 200 can include an on/off button 202 and a working mode toggle 208 that can be moved to a total alarm mode position 210, a partial alarm mode position 212, or an annex mode position 214. User input selecting the on/off button 202 can activate or deactivate the security sensor 200, user input moving the working mode toggle 206 to the total alarm mode position 210 can cause the security sensor 200 to register with a control panel of a security system in accordance with a total alarm mode, user input moving the working mode toggle 206 to the partial alarm mode position 212 can cause the security sensor 200 to register with the control panel of the security system in accordance with a partial alarm mode, and user input moving the working mode toggle 206 to the annex mode position 212 can cause the security sensor 200 to register with the control panel of the security system in an annex zone of a secured area monitored by the security system. For example, the user input moving the working mode toggle 206 to the annex mode position 212 can cause the security sensor 200 to instruct the control panel to disassociate the security sensor 200 from a main zone of the secured area, such as a home zone, and associate the security sensor 200 with the annex zone of the secured area, such as a garage zone. In some embodiments, while the user input moving the working mode toggle 206 to the annex mode position 212 can cause the security sensor 200 to reregister its ambient zone with the control panel, but such user input can refrain from changing a working mode of the security sensor 200 (e.g. the security sensor 200 can remain in the total alarm mode despite changing zones). In some embodiments, the working mode toggle 206 can have a T-shape (FIG. 2) or be linear.

Figure 3:
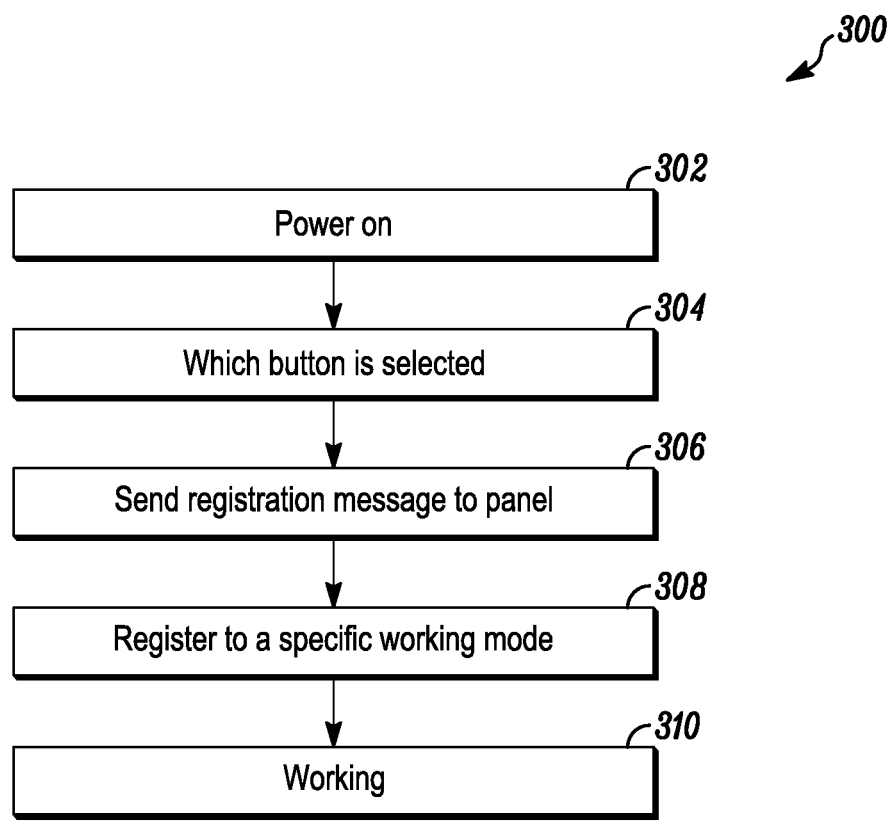
FIG. 3 is a flow diagram of a method in accordance with disclosed embodiments.

FIG. 3 is a flow diagram of a method 300 in accordance with disclosed embodiments. As seen in FIG. 3, the method 300 can include a security sensor (e.g. 100, 200) powering on as in 302, the security sensor receiving user input and identifying a button or a positon of a toggle selected by the user input as in 304, and the security sensor sending a registration message to a control panel as in 306. For example, in some embodiments, the registration message can identify a working mode of the security sensor that is associated with the button or the position of the toggle selected by the user input. Subsequently, the method 300 may include the security sensor registering with the control panel in accordance with the working mode of the security sensor that is associated with the button or the position of the toggle selected by the user input as in 308, and the security sensor operating in accordance with the working mode as in 310.

Figure 4:
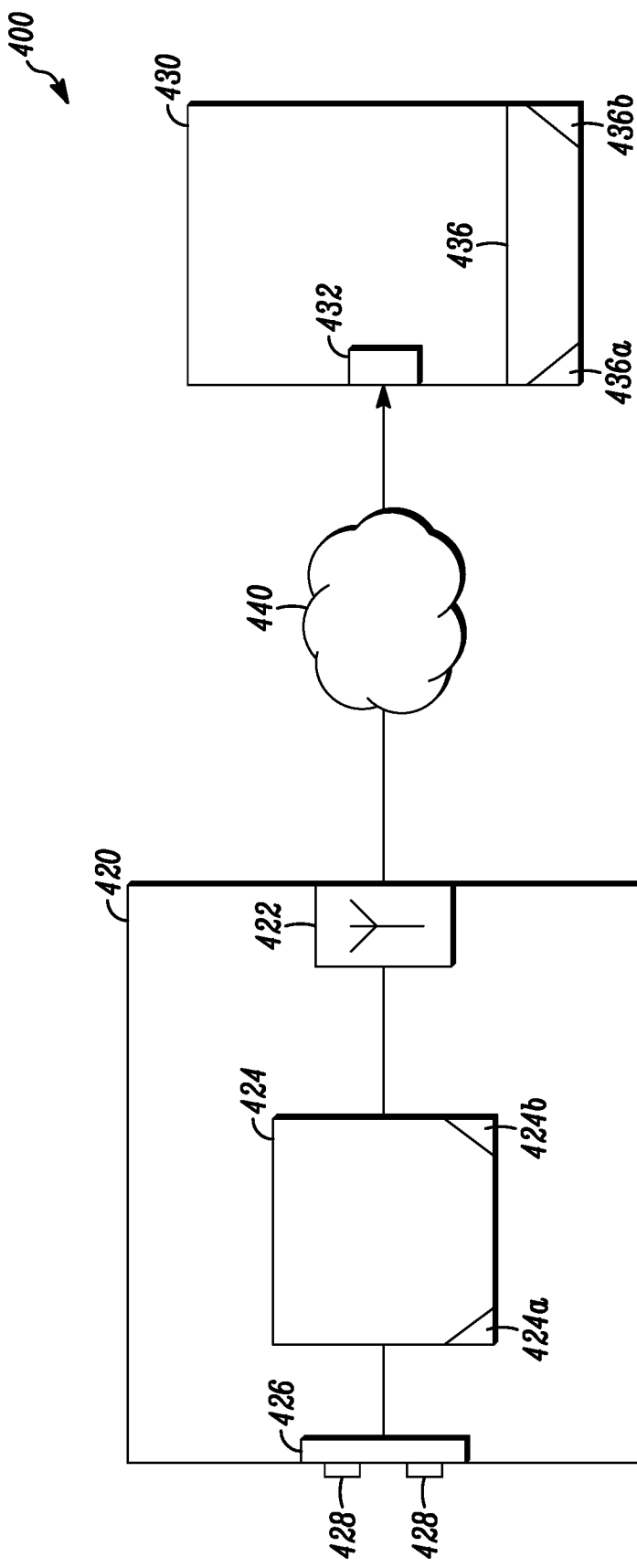
FIG. 4 is a block diagram of a system in accordance with disclosed embodiments.

FIG. 4 is a block diagram of a system 400 in accordance with disclosed embodiments. As shown in FIG. 4, the system 400 can include a security sensor 420 wirelessly communicating with a control panel 430 through a network 440. In some embodiments, the security sensor 420 may include an intrusion detector, a fire detector, a gas or carbon monoxide detector, a surveillance camera, a motion detector, or any other security sensor as would be known by those of skill in the art.

The security sensor 420 can include one or more buttons 428, a transceiver 422, user input circuitry 426, control circuitry 424, one or more programmable processors 424a, and executable control software 424b as would be understood by one of ordinary skill in the art. The executable control software 424b can be stored on a transitory or non-transitory computer readable medium, including, but not limited to local computer memory, RAM, optical storage media, magnetic storage media, flash memory, and the like. In some embodiments, some or all of the control circuitry 424, the programmable processor 424a, and the control software 424b can execute and control the methods described herein.

The control panel 430 can also include a transceiver 432, control circuitry 436, one or more programmable processors 436a, and executable control software 436b as would be understood by one of ordinary skill in the art. The executable control software 436b can be stored on a transitory or non-transitory computer readable medium, including, but not limited to local computer memory, RAM, optical storage media, magnetic storage media, flash memory, and the like.

In some embodiments, the user input circuitry 426 can receive user input selecting one or more of the buttons 428, can identify which of the buttons is selected by the user input, and can transmit a signal to the control circuitry 424 identifying a working mode associated with the selected button. In some embodiments, the control circuitry 424, the programmable processor 424a, and the control software 424b can receive the signal from the user input circuitry 426 identifying which of the buttons 428 is selected by the user input and can transmit a registration message to the control panel 430 through the network 440 in accordance with the signal received from the user input circuitry 426. For example, when the user input selects a first of the buttons 428, the control circuitry 424, the programmable processor 424a, and the control software 424b can transmit a first registration message to the control panel 430 to cause the security sensor 200 to register with the control panel 430 in accordance with a first working mode, but when the user input selects a second of the buttons 428, the control circuitry 424, the programmable processor 424a, and the control software 424b can transmit a second registration message to the control panel 430 to cause the security sensor 200 to register with the control panel 430 in accordance with a second working mode.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:
receiving a registration message from a security sensor at a control panel, wherein the registration message identifies one of a plurality of working modes for the security sensor, and wherein the one of the plurality of working modes is associated with first user input received by a user input device located on the security sensor; and
registering the security sensor with the control panel in accordance with the one of the plurality of working modes.

2. The method of claim 1 further comprising:
when the one of the plurality of working modes includes a total alarm mode, registering the security sensor with the control panel as operating in the total alarm mode.

3. The method of claim 2 further comprising:
when the control panel is operating with either an alarm-away status or an alarm-stay status, receiving an alarm message from the security sensor at the control panel.

4. The method of claim 2 further comprising:
when the control panel is operating with either an alarm-away status or an alarm-stay status, transmitting a notification message from the control panel to the security sensor to notify the security sensor about the alarm-away status of the control panel or the alarm-stay status of the control panel for use in activating the security sensor for detection of threats while the control panel is operating with either the alarm-away status or the alarm-stay status.

5. The method of claim 2 further comprising:
when the control panel is operating with either the alarm-away status or the alarm-stay status, transmitting an activation message from the control panel to the security sensor to activate the security sensor for detection of threats while the control panel is operating with either the alarm-away status or the alarm-stay status.

6. The method of claim 1 further comprising:
when the one of the plurality of working modes includes a partial alarm mode, registering the security sensor with the control panel as operating in the partial alarm mode.

7. The method of claim 6 further comprising:
when the control panel is operating with an alarm-away status, receiving an alarm message from the security sensor at the control panel.

8. The method of claim 6 further comprising:
when the control panel is operating with an alarm-away status, transmitting a notification message from the control panel to the security sensor to notify the security sensor about the alarm-away status of the control panel for use in activating the security sensor for detection of threats while the control panel is operating with the alarm-away status.

9. The method of claim 6 further comprising:
when the control panel is operating with an alarm-away status, transmitting an activation message from the control panel to the security sensor to activate the security sensor for detection of threats while the control panel is operating with the alarm-away status.

10. The method of claim 6 further comprising:
when the control panel is operating with an alarm-stay status, transmitting a notification message from the control panel to the security sensor to notify the security sensor about the alarm stay status of the control panel for use in deactivating the security sensor from detecting threats while the control panel is operating with the alarm-stay status.

11. The method of claim 6 further comprising:
when the control panel is operating with an alarm-stay status, transmitting a deactivation message from the control panel to the security sensor to deactivate the security sensor from detecting threats while the control panel is operating with the alarm-stay status.

12. The method of claim 1 further comprising:
receiving a reregistration message from the security sensor at the control panel, wherein the reregistration message identifies another of the plurality of working modes for the security sensor, and wherein the another of the plurality of working modes is associated with second user input received by the user input device located on the security sensor; and
reregistering the security sensor with the control panel in accordance with the another of the plurality of working modes.

13. The method of claim 1 further comprising:
receiving an association message from the security sensor at the control panel; and
associating the security sensor with a first zone of a secured area monitored by the control panel,
wherein the association message instructs the control panel to associate the security sensor with the first zone.

14. The method of claim 1 further comprising:
associating the security sensor with a first zone of a secured area monitored by the control panel,
wherein the registration message identifies the first zone.

15. The method of claim 1 further comprising:
associating the security sensor with a first zone of a secured area monitored by the control panel;
receiving a disassociation message from the security sensor at the control panel, wherein the disassociation message instructs the control panel to disassociate the security sensor from the first zone;
disassociating the security sensor from the first zone;
receiving an association message from the security sensor at the control panel, wherein the association message instructs the control panel to associate the security sensor with a second zone of the secured area; and
associating the security sensor with the second zone.

16. The method of claim 1 further comprising:
associating the security sensor with a first zone of a secured area monitored by the control panel;
receiving a reregistration message from the security sensor at the control panel;
disassociating the security sensor from the first zone; and
associating the security sensor with a second zone of the secured area,
wherein the reregistration message identifies the second zone.

17. The method of claim 1 further comprising:
associating the security sensor with a first zone of a secured area monitored by the control panel;
disassociating the security sensor from the first zone; and
associating the security sensor with a second zone of the secured area without changing a registration of the security sensor with the control panel in accordance with the one of the plurality of working modes.

18. A security system control panel comprising:
a transceiver; and
control circuitry,
   wherein the transceiver receives a registration message from a security sensor that identifies one of a plurality of working modes for the security sensor,
   wherein the one of the plurality of working modes is associated with first user input received by a user input device located on the security sensor, and
   wherein the control circuitry registers the security sensor with the security system control panel in accordance with the one of the plurality of working modes.

19. The security system control panel of claim 18 wherein, when the one of the plurality of working modes includes a total alarm mode, the control circuitry registers the security sensor with the security system control panel as operating in the total alarm mode, and wherein, when the security system control panel is operating with either an alarm-away status or an alarm-stay status, the transceiver transmits a notification message to the security sensor to notify the security sensor about the alarm-away status of the security system control panel or the alarm-stay status of the security system control panel for use in activating the security sensor for detection of threats while the security system control panel is operating with either the alarm-away status or the alarm-stay status or transmits an activation message to the security sensor to activate the security sensor for the detection of the threats while the security system control panel is operating with either the alarm-away status or the alarm-stay status.

20. The security system control panel of claim 18 wherein, when the one of the plurality of working modes includes a partial alarm mode, the control circuitry registers the security sensor with the security system control panel as operating in the partial alarm mode, and wherein, when the security system control panel is operating with an alarm-away status, the transceiver transmits a notification message to the security sensor to notify the security sensor about the alarm-away status of the security system control panel for use in activating the security sensor for detection of threats while the security system control panel is operating with the alarm-away status or transmits an activation message to the security sensor to activate the security sensor for the detection of the threats while the security system control panel is operating with the alarm-away status.

* * * * *